W. Walker,
Picture Exhibitor.

N° 55,561.          Patented June 12, 1866.

Witnesses.

Inventor:

UNITED STATES PATENT OFFICE.

WILLIAM WALKER, OF NEW HAVEN, CONNECTICUT.

PICTURE-HOLDER.

Specification forming part of Letters Patent No. 55,561, dated June 12, 1866.

*To all whom it may concern:*

Be it known that I, WILLIAM WALKER, of New Haven, in the county of New Haven and State of Connecticut, have invented a new and Improved Picture-Holder, especially adapted to card-photographs; and I do hereby declare that the following is a full, clear, and exact description thereof, which will enable those skilled in the art to make and use the same, reference being had to the accompanying drawings, forming part of this specification.

In the holder embraced by the present invention frames of a uniform size and shape are provided for the several pictures, which frames are so arranged, side by side of each other, in two rows or series (the number in each row being equal, but either more or less, according as may be desired) within a suitable box or casing, that by turning such box or casing, or a pedestal or handle attached to it, the several picture-frames, in regular order and succession, will be made to pass from one row to another, bringing each picture in turn to the outside of each row or series and in position for being viewed, as will be apparent from the following detail description thereof, reference being had to the accompanying plate of drawings, in which—

Figure 1:
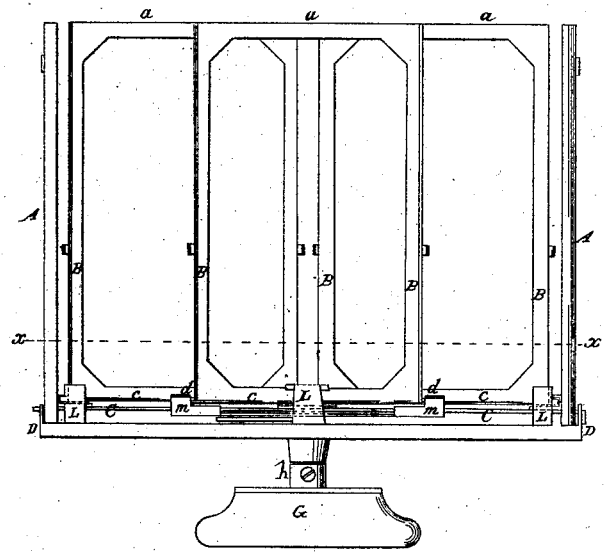
Figure 4:
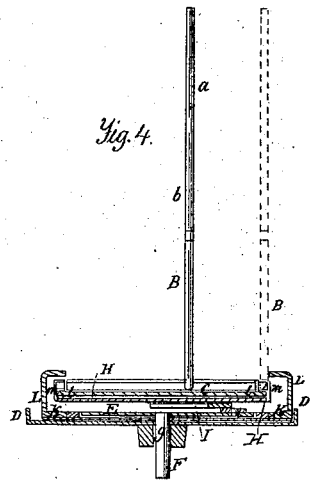
Figure 2:
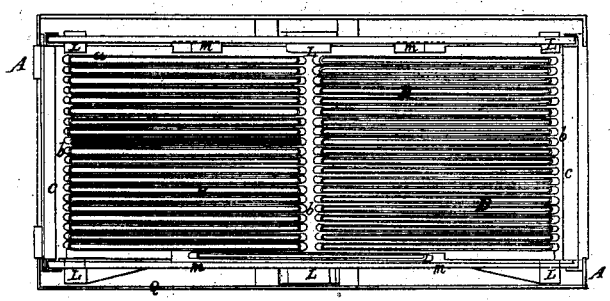
Figure 5:
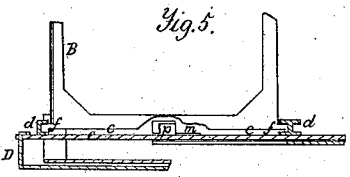
Figure 3:
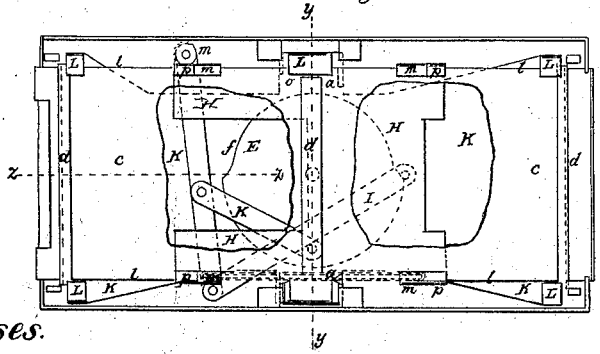

Figure 1 is a front elevation of the picture-holder, showing it supported upon a center pedestal; Fig. 2, a plan or top view; Fig. 3, a horizontal section taken in the plane of the line $x\,x$, Fig. 1, but with the several picture-frames removed; Fig. 4, a transverse vertical section taken in the plane of the line $y\,y$, Fig. 3; and Fig. 5, a vertical section taken in the plane of the line $z\,z$, Fig. 3, for a portion of the length of the holder.

A in the drawings represents the casing or box provided for the series of frames B, made of a uniform size, shape, and thickness, and each suitable to receive two pictures, which, when inserted in the frames, are placed with their back sides toward each other, the upper edge, $a$, of each frame being open, and its sides and lower edges, $b$ and $c$, closed. These frames B, by their lower edges, $c$, rest upon the inside plate, $c$, of the double bottom plate, D, of the box A, under parallel cross-flanges $d$ at each end, and at the center of which their corner pins, $f$, move. These frames are placed, as above stated, in two rows or series, side by side of each other, with one or more in one row than the other, be the whole number of pictures more or less, according to the capacity of the box A, as plainly shown in Fig. 2, consequently leaving one picture in each end frame of each row exposed to view, the pictures in the remaining frames being entirely covered from view.

To so operate the picture-frames arranged in two rows or series within the box or casing A, as described, that each of the frames in regular order and succession can be brought into position for the picture contained in or held by it to be seen, or, in other words, so as to be the end one of its row or series, I have arranged for that purpose, between the plates of the double or box bottom, a series of mechanical devices, as will be now explained, consisting of a horizontal disk or plate, E, having a cam-shaped edge, $f$, and attached to the upper end, $g$, of a spindle or shaft, F, turning in bearings of the bottom plate of the box A, with a pedestal, G, secured to its lower end by a set-screw, $h$.

H is a plate placed below the upper or inside plate, $c$, upon the sides $l\,l$ of which it is hung by the bent lips $m$ upon each of its sides, with one at or near its ends. To the under side of the plate H one end of a rod, I, is hung, the other end of which is hung to a rod, J, of equal length, turning upon a fulcrum-pin, $m$, of the inside of the bottom plate of the box A.

K is an arm hung at one end to the top of cam-disk E, and at its other to the plate J. By connecting the plate H with the cam-disk E, as above explained, it is obvious that if the disk be revolved by turning the pedestal G, attached to its spindle F, a reciprocating rectilinear motion will be imparted to the plate H in the direction of the length of the plate $c$ of the box upon which it slides.

K′ is a plate placed beneath the cam-disk E, resting upon the lower bottom plate of the box A, which plate K′ has upon each of its sides, at or near each end and at the center, upright arms L L, the upper ends of which are bent over. (See Fig. 4.) Against the edge $o$ upon each side of this plate K′ the cam-edge of the revolving disk E acts, it being intended that the contour of the cam-edge shall be of such a shape as to slide the bent arm-plate K′ laterally upon the bottom plate of the box A, so as to alternately bring the arms upon its respective sides up and against the picture-frames of the same side of the box A, and at such times with regard to the reciprocating rectilinear movement of the plate H, as will be hereinafter stated.

The operation of the picture-holder arranged as above explained is as follows: First, take the box or casing A in one hand with its side Q toward you, when turn the pedestal to the right, which moving the plate H from the left to the right, the outside or end picture-frame of the left-hand row of frames is carried along with it, (suitable sockets p p being provided at the proper points upon such plate to receive the two pins at the lower corner of the said frame,) when, having been brought exactly in line with the other or right-hand row of frames, the plate H then moves back toward the left-hand row, leaving the frame carried by it, as above explained, but taking with it another frame upon the back or rear end of the right-hand row of frames, and carrying it to the rear end of the left-hand row, where, leaving it, the frame at the front end of such row is then carried to the right-hand row as the plate again moves forward in that direction, and so on through the whole series, or as long as may be desired, thereby bringing, as is obvious, in regular order and succession, each frame contained in the double row of frames to the front end of the left-hand row, so that the picture contained in such frame can be viewed, the bent arms L of the laterally-transverse sliding plate K' of the picture box or casing A, through the cam E, being brought to bear upon the double row of frames and alternately upon the front and rear sides of the same at the proper times, to slide the picture-frames along under the flanged strips of the bottom plate, c, to alternately bring the outer or end ones of such rows into position for the sockets of the sliding or carrier plate H to engage with its corner pins, f, so as to take it (the frame) along with it as it moves forward or backward, as the case may be and as explained.

From the above description it is plain to be seen that by turning the pedestal G each frame of the series of frames can be brought to view, so as to enable the picture contained in it to be seen, each frame making, if the pedestal is turned for a sufficient length of time and in one and the same direction, a complete circuit, as it were, of the entire box or casing—that is, for instance, take the outside or end frame of the left-hand row of frames, it is first carried therefrom to the right-hand row, becoming then the outside or end one of such row, when, by continuing the turning of the pedestal, such frame will gradually be slid or moved through the entire depth or thickness of said row until, becoming its rear-end frame, it is then carried back to the row from which it was taken, but to its rear or back end, of which row it, in its regular turn, again becomes its front-end frame when it has completed the circuit, as is obvious.

It may be here remarked that, in lieu of taking the picture-holder in the hand and turning its pedestal, it may be placed by its pedestal upon a table or other suitable place, and then the box or casing A revolved, with the pedestal held firm and stationary, it being obvious that the picture-frames will be moved as before.

The box or casing A of the picture-holder may be provided with glass plates both upon the front and rear, and constructed in any suitable or ornamental mode desired, and I do not intend to limit myself to any particular style in which its exterior may be made.

With a picture-holder having the general features hereinabove explained, it is plainly apparent that the pictures inserted in it, if it is provided with a suitable exterior covering or casing, can by no possibility become injured or defaced, a quite important desideratum with " card-photographs," so called, as well as with many other styles of pictures, my improved picture-holder being simple, cheap, and susceptible of being manufactured with any display of taste and design necessary to satisfy the wants of the trade.

I claim as new and desire to secure by Letters Patent—

1. A holder for pictures, cards, and for other analogous purposes, consisting of a series of frames or their equivalents placed one in front of another, but in two rows or sections, when such frames are so connected through any suitable mechanism with the outer casing or box in which they are arranged, or with a pedestal or other portion of the same, that by either revolving such casing or box, or its pedestal, or other portion thereof so connected, the said picture-frames, in regular order and succession, can be brought to the end of each row or section in proper position for being viewed, substantially in the manner described.

2. The combination of the reciprocating sliding carrier-plate H with the transverse sliding plate K', when both connected with and operated by a common revolving disk, E, of the box or casing A, or its equivalent, and arranged with regard to the double row of frames B so as to act upon the same, substantially in the manner and for the purpose specified.

WILLIAM WALKER.

Witnesses:
THOMAS NAULTY, Jr.,
THOMAS WILLIAMS.